May 17, 1960  J. J. KUESER  2,936,697
AUTOMATIC-OPENING COOKING APPLIANCE
Filed Dec. 7, 1954　　　　　　　　　　　　　　　　2 Sheets-Sheet 1
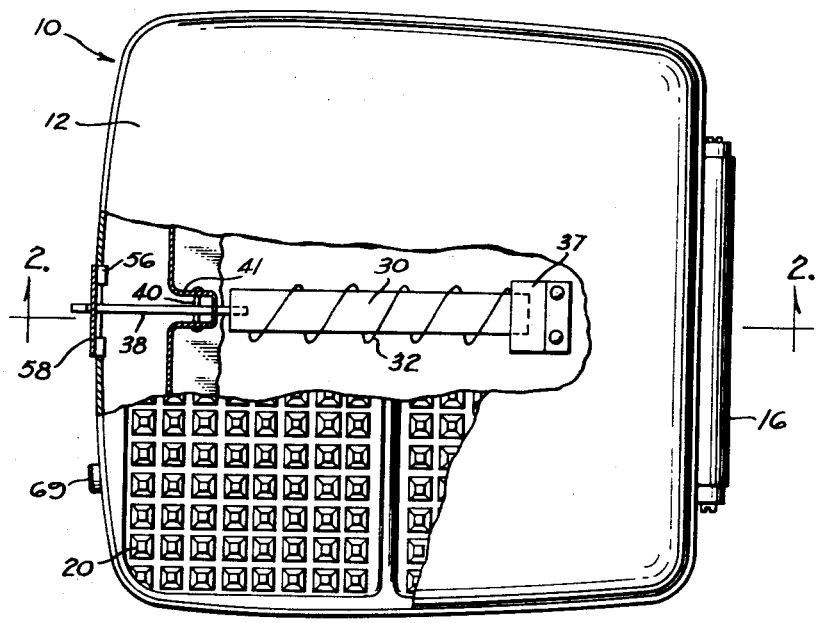
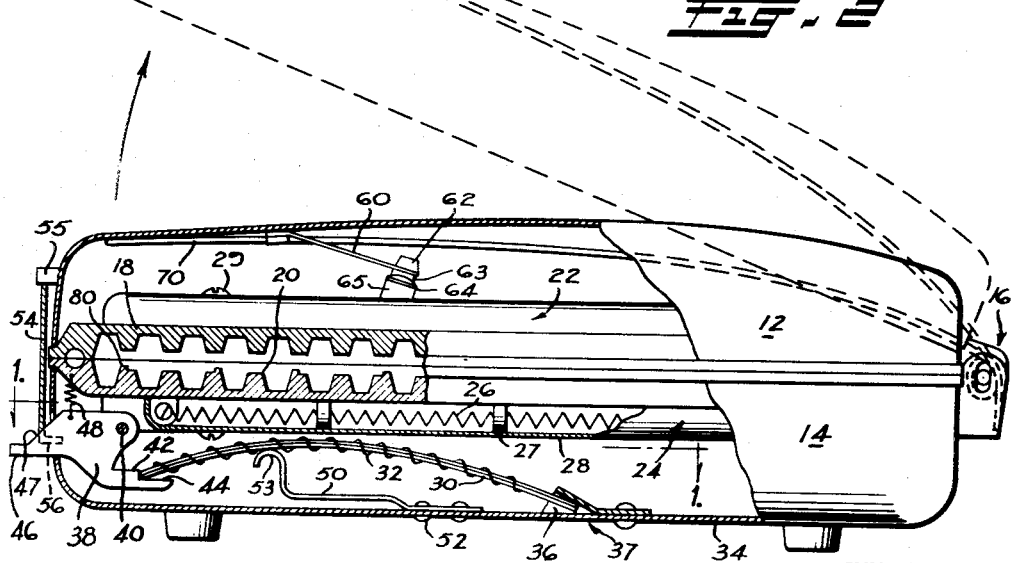
INVENTOR.
John J. Kueser
BY Pair, Freeman
& Molinare
Atty's.

May 17, 1960  J. J. KUESER  2,936,697
AUTOMATIC-OPENING COOKING APPLIANCE
Filed Dec. 7, 1954  2 Sheets-Sheet 2
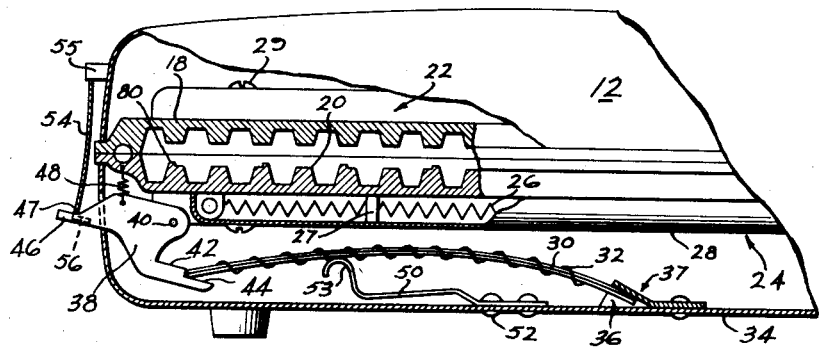
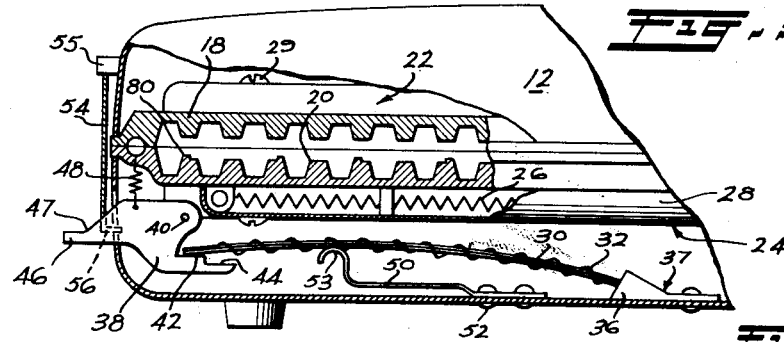
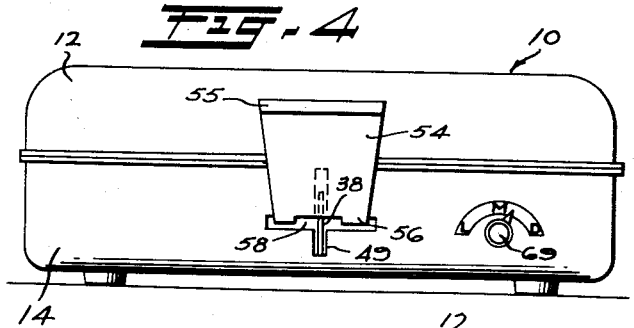
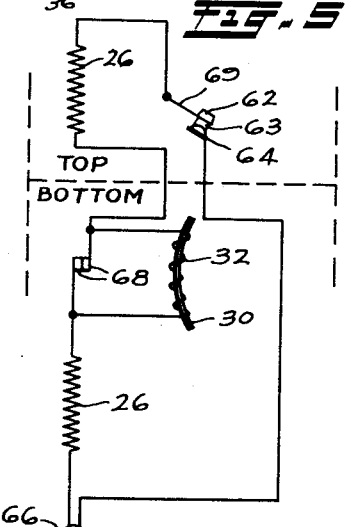
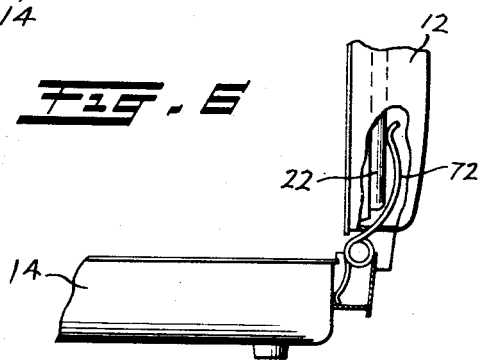
INVENTOR.
John J. Kueser
BY Bair, Freeman
& Molinare
Atty's.

United States Patent Office 2,936,697
Patented May 17, 1960

2,936,697

AUTOMATIC-OPENING COOKING APPLIANCE

John J. Kueser, St. Louis, Mo., assignor to Knapp-Monarch Company, St. Louis, Mo., a corporation of Delaware Application December 7, 1954, Serial No. 473,699

9 Claims. (Cl. 99—331)

This invention relates generally to a baking appliance, and more particularly to a novel waffle iron construction.

It is a primary object of the present invention to provide a cooking or baking appliance of the type having a base, and a cover adapted to be closed in engagement with the base during a cooking or baking operation, wherein novel means are provided for automatically opening the appliance in accordance with the requirements of the cooking or baking cycle.

It is another object to provide, in an appliance of the aforesaid type, power means responsive to the initial requirements for, or the final completion of, a cooking or baking operation, wherein said power means is operative to effect automatic release of a latching mechanism.

It is a further object of this invention to provide an automatic-opening appliance having elevating means normally tending to bias a cover shell in an open position relative to a base shell, means for latching the cover shell in closed engagement with the base shell against the force of the elevating means for performing a cooking or baking operation, and temperature responsive power means for providing a mechanical force to effect release of said latching means and consequent opening of said appliance cover shell when a predetermined temperature is reached.

It is still another object of this invention to provide an automatic-opening appliance having a power means automatically responsive to the requirements and conditions of a cooking or baking cycle and operative to exert a positive opening force for separating the appliance cover from its base.

It is still a further object to provide an automatic-opening appliance having its cover latched in a closed position relative to its base when in operation, and having a temperature-expandible power bimetal for exerting a mechanical force to effect release of the latching means and permit automatic opening of the appliance, in accordance with the requirements of a cooking cycle, and further having means for automatically rendering the power bimetal temporarily inoperative after unlatching to permit immediate relatching of the cover in a closed position without the necessity of a waiting period for cooling and retraction of the expanded bimetal.

It is yet another object to provide automatic elevating means for an appliance of the type described comprising a main power spring arranged so as to exert a positive lifting force at a point closely adjacent the forward or opening end of the appliance remote from the hinged end thereof.

It is yet another object of this invention to provide retaining means in the lower grid of an automatic-opening baking appliance for insuring retention of the baked food on the lower grid surface after opening of the cover.

With these and other objects in view, my invention consists in the construction, arrangement and combination of the various parts of my Automatic-Opening Cooking Appliance whereby the objects contemplated are obtained as hereinafter more fully set forth, pointed out in my claims and illustrated in the accompanying drawing, wherein:

Figure 1 is a top plan view of a waffle iron constructed in accordance with the present invention, broken away and partly in horizontal cross-section to show details of internal construction;

Figure 2 is a side elevational view on a slightly enlarged scale of the waffle iron shown in Figure 1, parts being broken away and in section to show the details of construction;

Figures 3 and 3A are fragmentary views of a portion of Figure 2, showing the latch and bimetal actuator of the present invention in operative positions during a baking cycle;

Figure 4 is a front end view of the waffle iron shown in Figure 1; and

Figure 5 is a circuit diagram of the wiring system of the waffle iron shown.

Figure 6 is a sectional view showing the cover opening spring.

Referring now to the drawing, I have indicated a waffle iron construction generally at 10. The waffle iron 10 is of the usual type having a cover or upper shell 12 and a base or lower shell 14. The upper and lower shells are pivotally interconnected by means of an expansion hinge assembly 16. Upper and lower waffle baking grids 18 and 20 are enclosed within the cover and base shells, respectively, of the waffle iron. A pair of grid heating assemblies 22 and 24 are operatively associated with the waffle grids 18 and 20, respectively. In the embodiment illustrated, each of the grid heating assemblies 22 and 24 comprises an electrical heating element 26 of the well known resistance type. The heating elements 26 are supported by means of insulating washers 27 within an enclosing casing 28. The casings 28 are suitably secured, as by bolts 29, to the respective waffle grids. It will be understood that an extruded tubular heating element of the type which is integrally embedded within a grid casting may be employed, if desired, as an alternative heating element construction.

I have provided a novel automatic means, cooperating with a latch mechanism, for effecting automatic opening of the waffle iron in accordance with the requirements of a baking cycle. A power bimetal 30 having a surrounding resistance heating element 32 is positioned adjacent the bottom wall 34 of the waffle iron base shell 14. The one end of the bimetal 30 nearest the rear end of the waffle iron 10 is received within an upraised channel portion 36 of a fixedly positioned bimetal stop means 37, which is secured to the shell bottom wall 34 by means of rivets or the like. The power bimetal 30 cooperatively engages at its other or front end a latch release lever 38.

The latch lever 38 is suitably pivotally supported within the lower shell 14, as by means of a pin 40 secured to recessed wall portions 41 of the lower heating element casing 28, for example. The lever 38 is formed at its inner end with upper and lower shoulder levels 42 and 44, referred to collectively as an abutment portion. Although not shown, it will be understood that the power bimetal 30 may be provided with spring biasing means for urging it toward the stop means 37 to maintain its engagement therewith. Additionally, the power bimetal 30 may be provided with suitable restraining brackets, extending upwardly from the shell bottom wall 34 and at both sides of the bimetal along its length, for guiding and maintaining it in its correct position of adjustment. The shoulders 42 and 44 are cooperatively engaged by the adjacent front end of the power bimetal 30 in an operational sequence to be hereinafter described in detail. The outer end of the lever 38 provides a stop means or projection 46, and a latch-engaging cam surface 47. A spring 48 is secured at its lower end to the top edge of the lever 38, and at its upper end to the lower grid 20. The spring 48 is biased in tension and is stretched to an extended length when the lever 38 is in a normal position of generally horizontal alignment with the appliance shells in closed relation, as shown in Figure 2 of the drawing. A vertical slot 49 is formed in the front end wall of the waffle iron base shell 14, through which the forward end of the lever 38 extends. The slot 49 is of sufficient vertical height to permit free pivotal movement of the lever 38 about its pivot 40.

A spring blade 50 is fixedly secured, as by riveting 52, to the bottom wall 34 of the waffle iron base shell 14. A top bearing surface 53 of the spring blade 50 normally engages the power bimetal 30, and exerts a resilient upward force thereagainst. The purpose of the spring blade 50 is to permit closing of the appliance shells without the necessity of a waiting time interval between baking operations. The operation of the spring blade 50, and the cooperating functional importance of the spring 48, will hereinafter appear from a discussion of the practical operation of the invention.

A cover latch means 54, formed of a wide strip of spring metal, is rigidly secured along its upper edge to a mounting portion 55 of the waffle iron cover shell 12. The lower edge of the latch means 54 is formed with a spaced pair of inwardly projecting, resilient latch prongs 56. The prongs 56 are urged by the normal spring resilience of the latch 54 into a cooperating horizontal slot or perforation 58 formed in the waffle iron base shell 14. It will be apparent that when the cover shell 12 is lowered into closed engagement with the base shell 14 of the waffle iron, the prongs 56 of the latch means 54 will be snapped into slot 58 and resiliently biased therein so as to effect a locking of the cover shell 12 in a closed position. When the latch 54 is thus positioned, the cam surface 47 of the latch release lever 38 will be biased into contacting engagement with the lower edge of the latch at a point between the prongs 56 by means of the spring 48. It will be apparent that the spring 48 also serves to prevent the projection 46 of the lever 38 at all times from pivoting downwardly below the horizontal, thereby maintaining a cooperative relation between the shoulders 42, 44, and the terminal end of the power bimetal 30 thereabove.

A resilient weight-actuated switch blade 60 is fixedly secured at its one end to the top wall of the waffle iron cover shell 12. The other end of the switch blade 60 depends angularly downwardly from the cover shell top wall, and carries a weight 62 and a contact 63 thereon. A second contact 64 is fixedly secured by means of an insulating support 65 to the casing 28 of the upper grid heating assembly 22. The resilient switch blade 60 and the weight 62 are suitably selected and arranged so that the contacts 63 and 64 will be normally urged into contacting engagement by gravity when the cover shell 12 is in the lowered or closed position. When the cover shell 12 is elevated toward an open position, indicated in Figure 2 by the arrow and by dot-dash outline of the cover shell, the resilient switch blade 60 will overcome the gravity force component urging the contact 63 toward the contact 64, so as to effect a separating opening of the contacts 63 and 64.

It will be understood that although I have shown the switch blade 60 as being weight-actuated in response to gravity forces, other means of switch actuation may be effected in response to the raising and lowering of the cover shell 12. For example, suitable mechanical linkage means may be connected to the hinge assembly 16, whereby a switch will be opened and closed as the cover shell 12 is raised and lowered. As a further example, variations in the arcuate bow of a main elevating spring, employed to effect raising of the cover shell 12 when not locked in a lowered, closed position, in a manner hereinafter described in detail, may be utilized to effect switch actuation. It is intended, therefore, that the weight-actuated switch 60—65 shown in Figure 2 of the drawing serves only to illustrate a typical means for effecting opening and closing of a control switch in response to opening and closing of the automatic cooking appliance. Various modifications and variations in the particular mechanical details of a switch arranged to operate in the desired manner are broadly within the contemplation of the present invention.

Referring now more particularly to Figure 5 of the drawing, the electrical wiring of the present waffle iron construction is as follows. Suitable conducting wires provide an electrical flow path leading from one terminal of a plug 66, which is adapted to be connected to a source of electrical current, through the heating element 26 of the waffle iron base shell 14 through a pair of contacts 68 of a temperature-controlling thermostat, through the heating element 26 of the waffle iron cover shell 12, and through the contacts 63 and 64 of the weight-actuated cover switch, to the other terminal of the plug 66.

The temperature-controlling thermostat has not been shown or described in detail, but may be of any conventional type having a pair of switch contacts, such as those indicated at 68. The contacts are normally closed at room temperature, but are opened by a suitable bimetal element in response to the temperature of one or both of the waffle grids. As indicated in Figure 4 of the drawing, the temperature-controlling thermostat may also be provided with a manual regulating means 69 for adjusting the temperature at which the contacts 63 will be opened by the bimetal. Conventionally, calibrated indicia are provided to indicate various settings of the regulating knob 69 for "light", "medium", or "dark" waffle baking.

A main elevating spring 70 is pivotally secured to a suitable portion of the hinge assembly 16, and extends within the waffle iron cover shell 12 in contacting engagement with the top wall thereof. The spring 70 is strongly biased so as to exert an elevating force against the top wall of the cover shell 12 in a clockwise direction, as indicated by the arrow in Figure 2. Unless locked in closed position by the latch 54, the main spring 70 will operate to maintain the cover shell 12 in a raised or open position relative to the base shell 14.

As best seen in Figure 2 of the drawing, the spring 70 extends forwardly to a point closely adjacent the front end of the cover shell 12. It is necessary to terminate the spring near the front end of the shell cover 12 so that the tensioning effort of the spring will be applied against the cover at a point closely adjacent the latch means 54, rather than at a point nearer to the hinge assembly 14. Such an arrangement is important in order to prevent the rear end of the top shell 12 from being lifted by the spring action vertically away from the bottom shell at the hinge assembly 16. The hinge 16 is of the well-known expansion hinge type, which permits the upper and lower shells to separate as the waffle batter expands during baking. It is undesirable to permit such separation of the shells by the spring 70 when the cover is closed without batter in the iron, as might occur for example during preheating.

The rear end of the spring 70 has a plurality of helical turns within the hinge assembly 16, and a short terminal length extends downwardly within the hinge assembly casing to take up the reaction forces which occur during operation. The spring 70 is preferably made of a high temperature resistant stainless steel wire about ⅛ inch in diameter. The spring 70 should be properly tensioned upon installation so that the upper shell will open with a smooth and even action. Further, the force of the spring 70 should decrease considerably when the top shell assumes a full open or substantially vertical position. The spring 70 must not have too much power at the full open position, or there may be some risk of tipping the entire appliance backwardly off of its supporting feet. Such tipping can be effectively prevented by proper formation of the spring 70, and may be further provided for by means of an additional safety spring 72 adapted to exert an opposing force only when the upper shell is in the full open position (see Figure 6).

Although only one spring 70 has been illustrated, it will be understood that a plurality of symmetrically disposed springs may be desirable, and such a modification is within the contemplation of the present invention.

Operation

The practical operation of my novel automatic-opening waffle iron will now be described in detail. The electrical plug 66 is first plugged into a suitable house current fixture for operatively connecting the waffle iron to a source of electrical current. The upper shell 12 is manually lowered to a closed position, and will be locked in such closed position by the automatic operation of the latch means 54. Such lowering of the upper shell 12 will be against the restraining or elevating force normally exerted by the main spring 70. The contacts 68 of the temperature-controlling thermostat will be normally closed when the iron is in a cool condition, and the contacts 63 and 64 of the weight-actuated switch will also be closed because of the lowered position of the upper shell 12. It will be apparent from the circuit diagram of Figure 5 that series current will be supplied through the heating elements 26 of the upper and lower grid heating assemblies 22 and 24.

When the grids have reached a temperature of approximately 420° F., the contacts 68 of the temperature-controlling thermostat will be opened by a bimetal element in the well known manner. As clearly shown in Figure 5, the heating element 32 for the bimetal 30 is connected in the electrical circuit in parallel about the contacts 68. When the contacts 68 have been opened the full series current will flow through the heating element 32, causing rapid heating of the bimetal 30 to a high temperature. The deflection characteristics of the bimetal 30 are suitably preselected so that the heated bimetal will deflect from the bowed position shown in Figure 2 in the drawing to the relatively straighter form shown in Figure 3. As the bimetal 30 straightens, its forward end will abuttingly engage the shoulder 44 of the latch release lever 38, and effect a pivotal movement of the lever 38 about its pivot point 40 in a clockwise direction.

In normal operation the ambient temperature within the lower shell portion 14, after baking operation, will be of the order of about 400° F. Due to this high ambient temperature in the lower shell, it is necessary for the power bimetal 30 to be heated to a relatively high temperature before effecting release of the latching mechanism. In order to provide a bimetal having sufficient strength for efficient operation it is necessary for it to attain a temperature of about 900° F.

The ordinary type of thermometal deflects considerably from a temperature differential of 70° F. (normal room temperature) to 900° F. (efficient thermometal temperature). In order to accommodate such large deflections, it would be necessary to provide a lower shell of considerable vertical depth. In addition, such extreme deflections in the short periods of time involved in a normal waffle baking cycle, would result in excessive stress upon the bimetal which would seriously effect its calibration and reliability.

It is an important feature of this invention to provide a thermo-metal arrangement which is relatively stable at lower temperatures up to about 400° F., but which thereafter develops a positive deflection at a rapid rate up to its maximum deflection within the temperature range of about 400° F. to 900° F. Such functional operation can be achieved in several ways. For example, two separate bimetal blades which have dissimilar characteristics may be employed so that the minor one reacts against the major one until the desired operating temperature is reached, at which point the major one provides a sufficient force of increasing magnitude to overcome the opposition of the minor one and move rapidly in the desired direction. Another arrangement employs a single bimetal element having special heat deflecting characteristics which result in a stable condition up to a temperature of about 400° F., and a rapid rate of deflection thereafter. The necessary power for such a bimetal may be predetermined by suitably proportioning the width and thickness of the element.

I prefer to select a single bimetal of the type which does not deflect appreciatively until it attains a relatively high temperature of the order of about 400° F. For example, I may employ a bimetal generally known as "Saflex." which has the characteristic of "reverse" deflection or shortening within the range of from about 75° F. to 375° F. and thereafter exhibits positive deflection or elongation for increasing temperatures up to about 900° F.

As the bimetal unbows to a relatively flat shape, thus substantially increasing its effective length between the fixed stop means 37 and the latch release lever 38, the resulting clockwise pivoting of the latch lever results in a forward and upward movement of the cam surface 47. The lower edge of the latch means 54 which contactingly engages the cam surface 47 of the latch release lever 38 will be forced upwardly and outwardly so as to effect a withdrawal of the latch prongs 56 from the shell slot 58. In this manner, the latch 54 will be released from the lower shell 14, thereby allowing the main spring 70 to lift the upper shell 12 to an elevated position. When the upper shell 12 is sufficiently elevated, the contacts 63 and 64 of the weight-actuated cover switch will be open, thereby de-energizing the grid heating elements 26 and the bimetal heating element 32.

Cooking batter may now be poured onto the lower grid 20, and the top shell 12 lowered and closed to a latched-in position. Within about 10 seconds after pouring the batter, the relatively cool temperature of the batter will reduce the grid temperature to a sufficiently low point so that the contacts 68 of the temperature-controlling thermostat will be closed, thereby energizing the grid heating elements 26 for the baking cycle. The weight-actuated cover switch contacts 63 and 64 will, of course, also be closed by the lowering of the upper shell 12, and the bimetal 30 will be bypassed by the main series flow of current through the contacts 68.

When the waffle has been baked to the desired color, as predetermined by manual setting of the thermostat regulating knob 69, the contacts 68 of the temperature-controlling thermostat will be opened. The bimetal heating element 32 will again carry the full series current and cause the power bimetal 30 to deflect to an unbowed or elongated form, thereby pivoting the latch release lever 38 about the pivot point 40 until the cam surface 47 forces the bottom edge of the latch means 54 away from the lower shell 14 to withdraw the latch prongs 56 from the slot 58. This, of course, is the same sequence of operation as previously set forth above with respect to the preheating of the waffle iron.

With cooking batter on the grids, there is now a very important difference in the opening operation of the waffle iron. In the baking of waffles, it should be noted that the baked waffles often tend to stick to the grids. Such sticking is not excessive in a normal waffle iron where the necessary precautions have been taken to treat the surface of the grids and to prepare the batter properly. In the case of the automatic-opening waffle iron as herein disclosed, such sticking, though slight, may be of considerable importance. Normally, slight sticking is not harmful in a conventional waffle iron because it will be readily overcome by manual lifting of the upper assembly. Such manual lifting will readily break loose the waffle from the grids without serious effort. In my automatic-opening waffle iron, however, the main spring 70 may not have sufficient strength for both elevating the upper shell and breaking the waffle loose from the grids.

I have therefore arranged my novel latch and releasing means so as to operate not only for effecting an opening of the latch but also for exerting a positive force tending to separate the waffle grids. When the power bimetal 30 has been heated and unbowed, the right hand end (as viewed in Figures 2 and 3) will be restrained by the stop means 37 and the left hand end will progressively move to the left and outwardly. First, the moving end of the bimetal 30 will engage the shoulder 44 of the latch release lever 38 and rotate it clockwise so that the cam surface 47 will urge the latch means 54 out of locking engagement. If the waffle should stick to the grids at this point sufficiently so that main spring 70 cannot elevate the upper shell and separate the grids, then the power of the bimetal 30 is effectively utilized to force the grids apart because of the engagement of the lower edge of the latch means 4 upon the stop projection 46 of the release lever 38. As the lever 38 continues its clockwise movement the latch means 54 will be urged upwardly so as to elevate the upper shell 12 relative to the lower shell 14. For example, I have found that forced separation of the grids to a distance of about 5/16 of an inch at the front end of the waffle iron is sufficient to break a waffle loose from the grids. The main spring 70 is then free to raise the upper shell assembly to an open position.

In an automatic-opening waffle iron, it is desirable to assure that the baked waffle will always adhere to the lower grid upon upening of the cover. In practice, the problem of waffle sticking sometimes results in adherence of the waffle to the top grid, and sometimes to the lower grid. For uniform automatic operation, I prefer to insure retention of the baked waffle, despite sticking, to the bottom grid. For this purpose, I provide a number of small nibs or hook-like projections 80, integrally cast into or otherwise secured to the lower grid 20. Such means serves to more strongly retain the waffle on the lower grid than the opposed tendency of sticking forces to retain the waffle on the upper grid.

Where the waffle iron is employed in continuous operation, the power bimetal 30 is unable to cool sufficiently during the waiting time between waffle baking operations. In such a case, the latching lever would not properly lock into position to hold the upper shell down. I therefore provide the spring blade 50. Before the waffle iron has opened after a heating operation, and while the bimetal 30 is deflecting to its elongated position, the free end of the bimetal abuttingly engages the shoulder 44 of the latch release lever 38 to effect pivotal rotation thereof in a clockwise direction. The upward biasing force exerted by the spring blade 50 is not sufficient to displace the bimetal 30 upwardly out of engagement with the shoulder 44 during elongation of the bimetal 30 and pivoting of the lever 38. When, however, the lever 38 has rotated a sufficient distance to permit the cam surface 47 to effect release of the latch means 54, and the waffles have been separated from the grids by further upward movement of the projection 46 and lifting of the latch means 54 and the upper shell 12, the spring 48 will contract and pivot the lever 38 still further to release the tight engagement between the shoulder 44 and the end of the bimetal 30. The spring blade 50 is then of sufficient strength to elevate the free end of the bimetal 30 upwardly out of the shoulder 44 onto the upper shoulder 42.

Now, when the upper shell is again closed the free end of the bimetal 30 does not function to exert a force against the shoulder 44, but freely rests out of engaged position on the upper shoulder lever 42. Thus, the upper shell may be closed immediately after a baking operation, without a waiting interval, even though the bimetal 30 is at an elevated temperature and elongated in form. The spring blade 50 provides an extremely simple and efficient means for permitting rapid recycling of my automatic-opening waffle iron on successive loads without waiting for any period of time between loads.

In summary, it will appear from the foregoing that the construction of an efficient automatic-opening appliance of the type described requires the satisfactory solution of several important problems. Initially, it is necessary to provide a sufficient elevating force to separate the top baking grid and lift the weight of the upper or cover section, as well as the added weight of the baked waffle itself if necessary. In effecting a practical design embodiment of my invention, I have found that limitations of space, the desire for manufacturing simplicity, and the requirements of pleasing external appearance have indicated the choice of a spring means rather than a motor for providing the necessary elevating force.

Next, a latch mechanism is required to hold the upper and lower appliance sections together agains the separating force of the elevating means. The provision of a simple yet efficient and reliable latching device represents an important feature of this invention. Thermostatically responsive means are necessary to control the latch mechanism and effect its automatic release in a predetermined manner in accordance with the requirements of the cooking cycle. I have found that a power thermostat, rather than a sensitive thermostat of the type which accurately senses grid temperature but does not provide any significant mechanical force, is required. The provision of such a power thermostat in cooperative relation with the latch mechanism within an operating enclosure of minimum size has resulted in the selection of a thermo-metal arrangement which is relatively stable at lower temperatures up to the ambient cooking heat within the appliance, and thereafter provides adequate actuating force at an elevated temperature range for effecting automatic opening operation. In connection with such a power bimetal, an electric control circuit is provided which is regulated in a novel manner in response to opening of the appliance.

The particular problem of waffle sticking has been solved by a novel arrangement employing the mechanical force of the latch-releasing power thermostat to force the baking grids apart against the inherent adhesion of a cooked waffle. The sticking tendency of the baked waffles is uniformly regulated by the provision of hook means to assure adherence of the cooked waffle to the lower grid following every baking operation of the appliance.

The difficulty of obtaining adequate cooling of the power thermostat between waffle bakings has resulted in the provision of the particular feature which permits the power thermostat to be released from actuating cooperation with the latch mechanism and allowed to cool during a portion of the next baking cycle, thereby permitting repeated re-latching without the necessity for a waiting period for cooling between bakings.

Although I have illustrated my invention in connection with a waffle iron construction, it will be obvious that the features disclosed herein for effecting automatic-opening operation would be equally applicable to any cooking or baking device of the type having two shell portions adapted to be closed during cooking or baking. For example, the features of my invention may be readily adapted for use with sandwich-grilling or griddle appliances.

Changes may be made in the construction and arrangement of the parts of my automatic-opening cooking appliance without departing from the real spirit and purpose of my invention, and it is my invention to cover by my claims any modified forms of structure or use of mechanical improvements which may be reasonably included within their scope.

What I claim as new and desire to obtain by Letters Patent of the United States is:

1. An appliance for baking comprising a base shell and a cover shell, a pair of baking grids one in each of said shells, said cover shell being pivotally mounted on said base shell and adapted to be closed relative to said base shell to position said grids in closely adjacent relation for baking operation, first biasing means normally operative to pivot said cover shell toward a full open position relative to said base shell, latch means for holding said cover shell in closed engagement with said base shell against the opening force of said biasing means, means for unlatching said latch means to render said biasing means freely operative to effect opening of said cover shell, said unlatching means comprising an elongated temperature-expandable bimetal having one end thereof abutting on the appliance and the other end thereof in contacting engagement with said latch means, said bimetal when longitudinally expanded being operative to exert a direct mechanical force, longitudinally of said bimetal, upon said latch means to release it and permit opening of the cover shell by said biasing means, and second biasing means engaging said bimetal and operative to retain it out of operative engagement with said latch after unlatching thereof thereby to enable immediate relatching of the cover in a closed position without the necessity of waiting for retraction of the longitudinally expanded bimetal from a position of unlatching engagement with said latch means.

2. An appliance for cooking or the like comprising a base shell and a cover shell, said cover shell being pivotally mounted on said base shell and adapted to be closed in engagement therewith for cooking operation and to be opened in spaced relation thereto for access, biasing means normally operative to pivot said cover shell toward a full open position relative to said base shell, latch means being releasably engageable between said base shell and said cover shell for holding said cover shell in closed engagement with said base shell against the opening force of said biasing means, movable latch release means for effecting release of said latch means to permit said biasing means to open said appliance, said latch release means including an abutment portion located in one of said shells, an elongated bimetal member having one end thereof anchored relative to said one shell and the other end engaging said latch release means abutment portion when said shells are in closed relation and being operatively actuated in response to a requirement of the cooking operation to tend to move apart said ends of the bimetal member so as to exert a force, longitudinally of said bimetal member, against said latch release means abutment portion to automatically move same to effect release of said latch means and to permit said biasing means to effect opening of said shells, said bimetal member being further operative after initial release of said latch means to continue to exert, through said latch release means, a positive opening force against the other shell, until substantial spaced separation of said shells is effected.

3. An appliance for baking comprising a base shell and a cover shell, a pair of baking grids one in each of said shells, said cover shell being pivotally mounted on said base shell and adapted to be closed relative to said base shell to position said grids in closely adjacent relation for baking operation, biasing means normally operative to pivot said cover shell toward a full open position relative to said base shell, latch means being releasably engageable, between said base shell and said cover shell for holding said cover shell in closed engagement with said base shell against the opening force of said biasing means, movable latch release means for effecting release of said latch means to permit said biasing means to open said appliance, said latch release means including an abutment portion located in one of said shells, grid heating means in each shell for providing baking heat to said grids, said grid heating means being energized when said cover shell is closed and de-energized when said cover shell is opened, power means engaging said latch release means when said shells are in closed relation, said power means comprising an elongated, normally arcuate and longitudinally temperature-expandable bimetal disposed within said one shell, said arcuate bimetal having one end thereof anchored relative to said one shell and the other end engaging said latch release means abutment portion and being rendered operative to exert a force, longitudinally of said bimetal, to move said latch release means and effect unlatching of said shells when heated to a predetermined high temperature in excess of the ambient temperature within said one shell due to the cooking temperature of said baking grids.

4. An appliance for baking comprising a base shell and a cover shell, a pair of baking grids one in each of said shells, said cover shell being pivotally mounted on said base shell and adapted to be closed relative to said base shell to position said grids in closely adjacent relation for baking operation, biasing means normally operative to pivot said cover shell toward a full open position relative to said base shell, latch means being releasably engageable, between said base shell and said cover shell for holding said cover shell in closed engagement with said base shell against the opening force of said biasing means, movable latch release means for effecting release of said latch means to permit said biasing means to open said appliance, said latch release means including an abutment portion located in one of said shells, grid heating means in each shell for providing baking heat to said grids, said grid heating means being energized when said cover shell is closed and de-energized when said cover shell is opened, power means comprising an elongated, normally arcuate and longitudinally temperature-expandable bimetal disposed within said one shell, said arcuate bimetal having one end thereof anchored relative to said one shell and the other end engaging said latch release means abutment portion and being rendered operative to exert a force, longitudinally of said bimetal, to move said latch release means and effect unlatching of said shells when heated to a predetermined high temperature in excess of the ambient temperature within said one shell due to the cooking temperature of said baking grids, and latch-release heating means operatively associated with said bimetal for heating it to said predetermined high temperature, said latch-release heating means being energized and de-energized in response to the temperature of said baking grids.

5. An appliance for cooking or the like comprising a base shell and a cover shell, said cover shell being pivotally mounted on said base shell and adapted to be closed in engagement therewith for cooking operation and to be opened in spaced relation thereto for access, biasing means normally operative to pivot said cover shell toward a full open position relative to said base shell, latch means being releasably engageable, between said base shell and said cover shell for holding said cover shell in closed engagement with said base shell against the opening force of said biasing means, movable latch release means for effecting release of said latch means to permit said biasing means to open said appliance, said latch release means including an abutment portion located in one of said shells, an elongated bimetal member having one end thereof anchored relative to said base shell and the other end engaging said latch release means when said shells are in closed relation and being operatively actuated in response to a requirement of the cooking operation to tend to move apart said ends of the bimetal member so as to exert a force, longitudinally of said bimetal member, against said latch release means to automatically move same to effect release of said latch means and to permit said biasing means to effect opening of said shells, said bimetal member being further operative after initial release of said latch means to continue to exert, through said latch release means, a positive opening force against the other shell until substantial spaced separation of said shells is effected, and means for limiting the opening position of said cover relative to said base for preventing a change in center of gravity location sufficient to move said appliance relative to a supporting surface.

6. An appliance for cooking or the like comprising a base shell and a cover shell, said cover shell being pivotally mounted on said base shell and adapted to be closed in engagement therewith for cooking operation and to be opened in spaced relation thereto for access, biasing means normally operative to pivot said cover shell toward a full open position relative to said base shell, latch means being releasably engageable between said base shell and said cover shell, for holding said cover shell in closed engagement with said base shell against the opening force of said biasing means, movable latch release means for effecting release of said latch means to permit said biasing means to open said appliance, said latch release means including an abutment portion located in one of said shells, power means comprising an elongated, normally arcuate and longitudinally temperature-expeandable bimetal having one end thereof abutting on the appliance and the other end thereof engaging the latch release means and being operative when heated to expand longitudinally to exert a force, longitudinally of said bimetal, against the latch release means abutment portion to automatically move same to effect release of said latch means and permit said biasing means to effect opening of said shells, a cooking member in each shell, a first heating means in each shell for providing cooking heat to each cooking member, and second heating means operatively associated with said arcuate bimetal for raising its temperature, said first heating means being energized in response to a requirement of the cooking operation, said bimetal having reverse longitudinal expansion within a range of temperatures of from about normal room temperature to about ambient cooking temperature within the appliance and positive longitudinal expansion at temperatures thereabove.

7. An appliance for cooking or the like comprising a base shell and a cover shell, said cover shell being pivotally mounted on said base shell and adapted to be closed in engagement therewith for cooking operation and to be opened in spaced relation thereto for access, biasing means normally operative to pivot said cover shell toward a full open position relative to said base shell, latch means being releasably engageable, between said base shell and said cover shell for holding said cover shell in closed engagement with said base shell against the opening force of said biasing means, movable latch release means for effecting release of said latch means to permit said biasing means to open said appliance, said latch release means including an abutment portion located in one of said shells, power means comprising an elongated, normally arcuate and longitudinally temperature-expandable bimetal having one end thereof abutting on the appliance and the other end thereof engaging the latch release means and being operative when heated to expand longitudinally to exert a force, longitudinally of said bimetal, against the latch release means abutment portion to automatically move same to effect release of said latch means and permit said biasing means to effect opening of said shells, a cooking member in each shell, a first heating means in each shell for providing cooking heat to each cooking member, and second heating means operatively associated with said arcuate bimetal for raising its temperature, said main heating means being energized in response to a requirement of the cooking operation, said bimetal shortening longitudinally within a range of temperatures from about 75° F. to about 375° F. and lengthening longitudinally thereabove to about 900° F.

8. An appliance in accordance with claim 2, wherein said bimetal exerts no appreciable unlatching force against said latch release means abutment portion until the bimetal attains a temperature above about 400° F.

9. An appliance in accordance with claim 3, wherein said bimetal exerts no appreciable unlatching force against said latch release means abutment portion until the bimetal attains a temperature above the ambient cooking temperature created within the base shell of the appliance by said grid heating means.

References Cited in the file of this patent

UNITED STATES PATENTS

| | | |
|---|---|---|
| 1,656,662 | Carter et al. | Jan. 17, 1928 |
| 1,790,083 | Armstrong | Jan. 27, 1931 |
| 1,836,192 | Shoenberg et al. | Dec. 15, 1931 |
| 1,915,211 | Balton | June 20, 1933 |
| 1,947,232 | Smith | Feb. 13, 1934 |
| 2,057,741 | Purpura | Oct. 20, 1936 |
| 2,102,342 | Walder | Dec. 14, 1937 |
| 2,132,622 | Ireland | Oct. 11, 1938 |
| 2,170,070 | Deleray | Aug. 22, 1939 |
| 2,180,233 | Graham | Nov. 14, 1939 |
| 2,320,347 | Brosseau et al. | June 1, 1943 |
| 2,342,077 | Jepson | Feb. 15, 1944 |
| 2,370,404 | Huck | Feb. 27, 1945 |
| 2,424,366 | Needre | July 22, 1947 |
| 2,508,464 | McCullough | May 23, 1950 |
| 2,520,997 | Cavanagh | Sept. 5, 1950 |
| 2,571,891 | Kassan et al. | Oct. 16, 1951 |
| 2,601,983 | Schollkopf | July 1, 1952 |
| 2,663,785 | Graham | Dec. 11, 1953 |